United States Patent [19]

Smith

[11] 4,313,081
[45] Jan. 26, 1982

[54] LINE DROP COMPENSATION DEVICE FOR AN ELECTRICAL DISTRIBUTION SYSTEM

[75] Inventor: David W. Smith, Alexandria, Va.

[73] Assignee: Caci, Inc. - Federal, Arlington, Va.

[21] Appl. No.: 136,264

[22] Filed: Apr. 1, 1980

[51] Int. Cl.³ .............................................. G05F 1/70
[52] U.S. Cl. ...................................... 323/209; 307/31
[58] Field of Search ............................ 307/11, 31, 33; 323/121, 128, 102, 105, 205, 208, 209, 210

[56] References Cited

U.S. PATENT DOCUMENTS 3,002,147  9/1961  Wasserman ..................... 323/128 X
4,101,100  7/1978  Smith et al. ..................... 244/114 R

*Primary Examiner*—William M. Shoop
*Attorney, Agent, or Firm*—Edmund M. Jaskiewicz

[57] ABSTRACT

A line drop compensator device for an aircraft flight line electrical distribution system has a plurality of service points connected at spaced locations along a three-phase power line and the current flow at each service point is sensed. In response to the sensed current flow, capacitance is added between the conductor lines and neutral of the power line so as to correct the voltage in proportion to the demand. Compensation is thus added proportional to the current drawn from the line.

7 Claims, 4 Drawing Figures

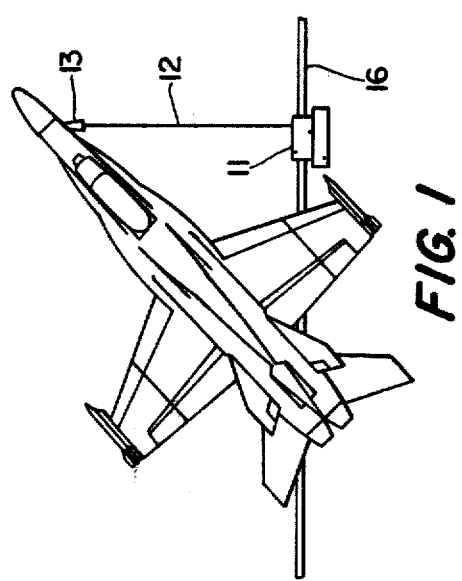
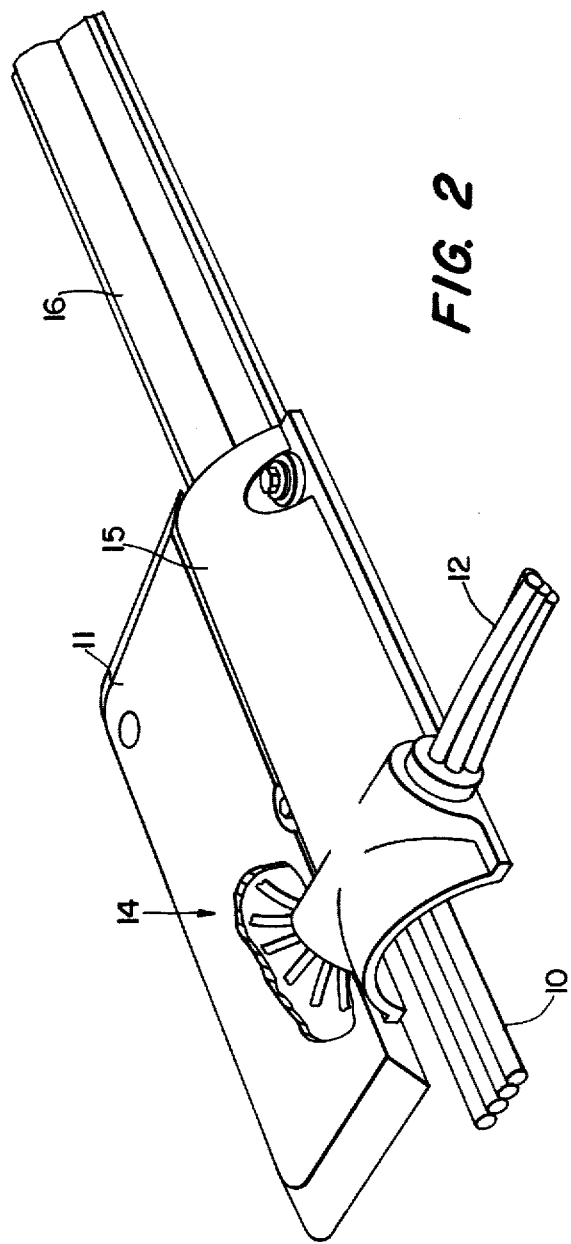

LINE DROP COMPENSATION DEVICE FOR AN ELECTRICAL DISTRIBUTION SYSTEM

The present invention relates to an aircraft flight line electrical distribution system, more particularly, to a dynamic line drop compensator for such a system.

The servicing and starting of aircraft, particular jet aircraft, on a flight line requires the ready availability of electrical energy at a voltage within a close tolerance voltage range. The electrical energy is provided through connector cables which extend along the flight line and is connected to a suitable source of electrical energy of a desired voltage and frequency. A plurality of spaced service islands are connected along the connector cables and each island has an aircraft service cable and a connector plug assembly. The service islands and the connector cables may be positioned upon the ground and covered with aluminum casting covers in order to allow aircraft to taxi over the system.

Present day aircraft flight line electrical distribution systems are capable of supporting aircraft requiring 6 KVA or less of electrical energy for servicing. As new aircraft become available which require larger amounts of electrical energy, the conductors of the flight line may cause voltage losses which are sufficiently large to reduce the voltage at each aircraft below that which the aircraft can tolerate. Also, older aircraft are equipped with new or updated electronic systems which require more energy for servicing, thus causing voltage losses in the conductors to increase which in turn reduces the voltage at each aircraft below that level which the aircraft can tolerate.

It has been proposed to utilize a line drop compensator so as to correct the voltage at the aircraft when multiple aircraft are connected to a single power source. Such known line drop compensators compensate for reactive losses in each load line. In those instances where multiple loads are connected to a single power source, attempting to correct the line drop by sensing total load current will bring about severe under and over voltage conditions in one or more of the multiple-load lines. Further, such known line drop compensators will not correct the voltages at the aircraft to 115±2 volts in a flight line electrical distribution system. The present known line drop compensators add capacity in series with the line.

It is therefore the principal object of the present invention to provide an improved aircraft flight line electrical distribution system which makes available electrical energy at a voltage with a close tolerance voltage range.

It is another object of the present invention to provide an aircraft flight line electrical distribution system which corrects the voltage at the aircraft when multiple aircraft are connected to a single power source proportional to the demand.

It is an additional object of the present invention to provide such an aircraft flight line electrical distribution system which senses the number and location of the aircraft on the distribution network and corrects the voltage proportional to the demand.

It is a further object of the present invention to provide a line drop compensator for an aircraft flight line electrical distribution system which can be packaged into a service island of the system and which corrects the voltage at the aircraft when multiple aircraft are connected to a single power source by sensing the number and location of the aircraft and correcting the voltage proportional to the demand.

The objects of the present invention are achieved and the disadvantages of the prior art are eliminated by the aircraft flight line electrical distribution system having a line drop compensator according to the present invention. According to one aspect of the present invention a line drop compensator device for an aircraft flight line electrical distribution system may comprise a plurality of service points for aircraft connected at spaced locations to a three-phase power line including a neutral line. At each service point there is means for sensing the current flow at that service point and for generating a proportional signal. The proportional signal is compared with a reference voltage and a control signal is then generated. In response to the control signal capacitance is added between the phase conductors of the power line and neutral to compensate for line inductance and for any lagging power factor caused by the aircraft load.

A plurality of compensating and control circuits may be provided so as to add additional capacitance to predetermined increases in current flow sensed in the power line at the service point.

Other objects and advantages of the present invention will be apparent upon reference to the accompanying description when taken in conjunction with the following drawings, which are exemplary, wherein;

FIG. 1 is a top plan view of a portion of an aircraft flight line electrical distribution system according to the present invention showing several service points and aircraft at the service points;

FIG. 2 is a perspective view of a service point in which is incorporated the dynamic line drop compensator of the present invention;

Proceeding next to the drawings wherein like reference symbols indicate the same parts throughout the various views a specific embodiment and modifications of the present invention will be described in detail.

Figure 3:
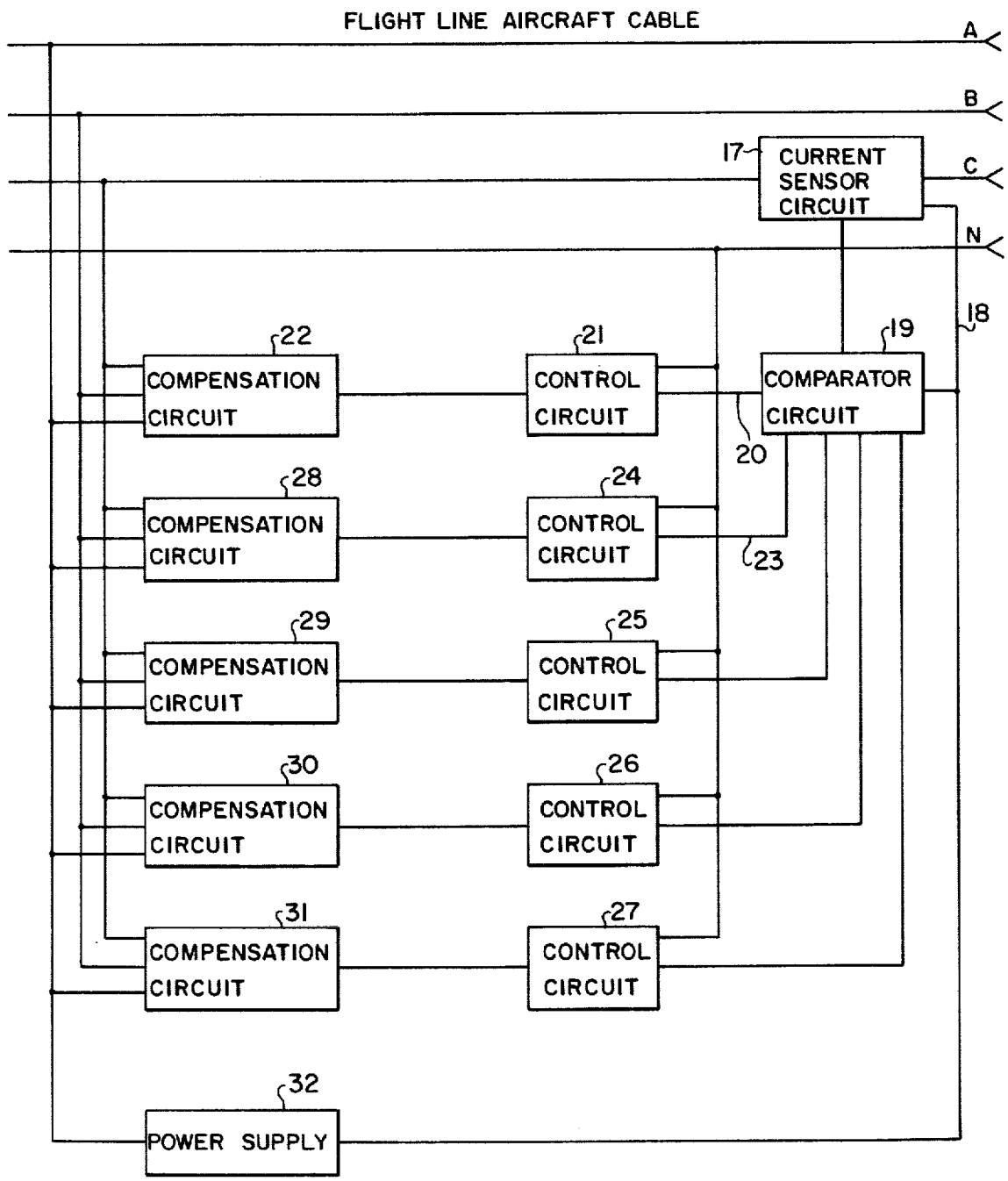
FIG. 3 is a schematic block diagram showing the electronic circuit of the dynamic line drop compensator of the present invention.

As may be seen in FIGS. 1 and 2, the aircraft flight line electrical distribution system comprises a plurality of interconnector cables 10 which extend along the flight line and are connected to a suitable source of electrical energy to provide 115/200 VAC, three-phase 400 Hz electrical energy. Spaced along the interconnector cables is a plurality of service points or islands 11 each of which is provided with an aircraft service cable 12, at the end of which is an aircraft connector plug 13. There is also a dynamic line drop compensator with each island and indicated at 14.

The interconnector cables may be connected to the service points by detachable electrical connectors as known in the art. In a similar manner the cables of the service cable 12 are connected to the service points by connectors. All the electrical connections are made to corresponding coupler components on the exterior of the service island. The connectors are preferably of the water-proof, quick-connector type.

The service islands 11 and interconnector cables 10 may be covered by aluminum casting covers 15 and 16 to allow aircraft to taxi over the system. The aluminum covers may be of the same type as disclosed in U.S. Pat.

No. 4 101 100 issued July 18, 1978. The aluminum covers and the enclosure for the interconnector cables and service points have such a height and shape to enable aircraft tires to pass readily over these components and the enclosures and covers are provided with suitable tie-down or fastener means so as to be secured upon the flight line surface.

The dynamic line drop compensator which is schematically illustrated in FIG. 3 adds capacitance from a line conductor to neutral at various current levels drawn by the aircraft. The interconnector cables 10 include a three-phase power line having phase conductors A, B, and C and neutral line N, as shown in FIG. 3. A current sensor 17 which may be a current transformer or a Hall generator is connected in phase conductor C and provides a low-lever A.C. voltage signal at 18 proportional to the current flow at the service island. This proportional signal is rectified and compared to a D.C. voltage signal in a signal comparator 19.

A current signal is generated at 20 by the comparator 19 and supplied to a control circuit 21 when the current level through the sensor 17 reaches a level of approximately 17.3 amperes. The signal 20 received by the control circuit 21 closes relay contacts which in turn connect a compensation circuit 22 to add capacitance between phase conductor A and neutral N, phase conductor B and neutral N and phase conductor C and neutral N. This capacitance is selected to counteract the line inductance and any lagging power factor which might be caused by the type of aircraft load.

The rectified signal received by the comparator circuit 19 may continue to increase as the current through the sensor 17 increases beyond 17.3 amperes to 34.6 amperes at which level the comparator circuit 19 sends a control signal at 23 to control circuit 24 causing relay contactors to close. Thus, another set of capacitance is added across phase conductors A, B, and C to neutral.

As the current through the current sensor 17 increases to 51.9 amperes another compensation 29 is added as a result of a control signal from control circuit 25. This process of adding additional capacitance continues in two more steps of 69.2 amperes and 86.5 amperes at which stage control circuits 26 and 27 are also actuated generate control signals to compensation circuits 30 and 31 to supply additional capacitance.

A power supply 32 conditions the 115 A.C. from phase A to supply electrical energy to the electronic current sensor 17 and to supply the comparators circuit 19 with the correct D.C. voltage.

The current levels at which the compensation circuits 22, 28, 29, 30, and 31 are added across phase conductors A, B, and C to neutral can be varied as may be desired to selected magnitudes in the current sensor circuit 17.

Figure 4:
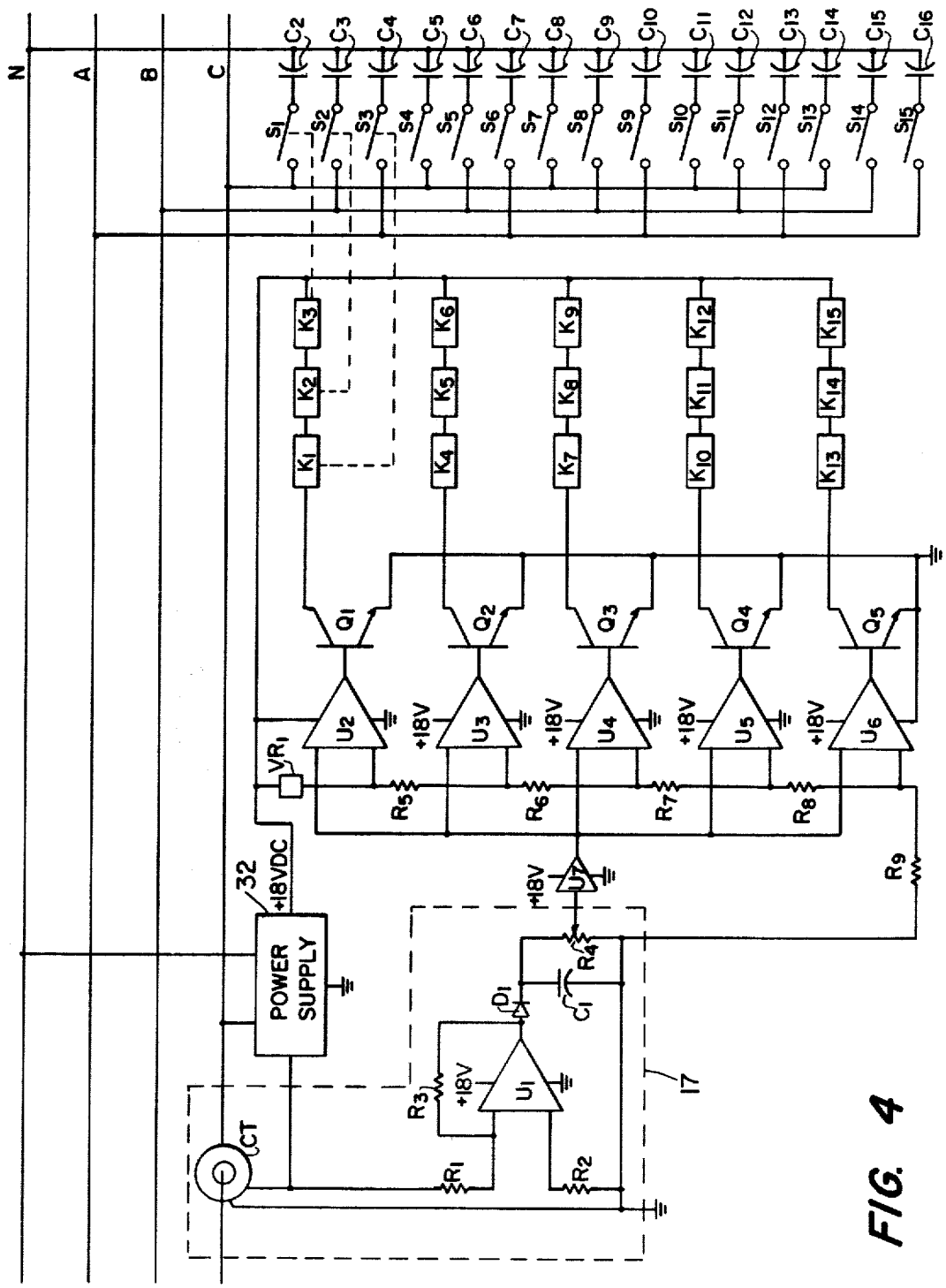
FIG. 4 is a schematic diagram showing the electronic circuitry and components of the block diagram of FIG. 3.

FIG. 4 shows in detail the circuitry and components of the block diagram of FIG. 3. In order to initiate the power supply 32, it is first necessary to insert the connector plug 13 into the aircraft service recepticle as shown with the aircraft in FIG. 1. This will then provide a current load from the phase C conductor to neutral when the aircraft internal electrical system is activated. The phase conductor C will then have a current flow and the current sensor C.T. will generate an A.C. voltage signal proportional to and at the same frequency as the current flowing through phase conductor C. The amplitude of this signal will be 0.1 volt for each ampere of current flowing through the current sensor C.T. When this signal reaches a magnitude of about 1 volt, the power supply 32 will be turned on and will then supply the other circuits with the condition 18 volt direct current. The voltage signal from the current sensor CT will be then impressed upon the amplifier $U_1$ through resistance $R_1$. Resistances $R_1$, $R_2$ and $R_3$ are provided to establish the gain level of the amplifier $U_1$.

The output of amplifier $U_1$ is rectified through diode $D_1$ and filtered through capacitor $C_1$ and resistor $R_4$ to produce a D.C. level. The D.C. voltage level is adjusted by resistor $R_4$ to a voltage level of 200 millivolts at the input to the buffer amplifier $U_1$ when 17.3 ampere current is flowing through the current sensor CT.

The comparators $U_2$, $U_3$, $U_4$, $U_5$ and $U_6$ compare the D.C. voltage level from the buffer amplifier $U_1$ to the present reference levels as provided by the voltage regulator $VR_1$ and the group of series resistors $R_5$, $R_6$, $R_7$, $R_8$ and $R_9$. The reference level at comparator $U_2$ is 1000 millivolts, at $U_3$ is 800 millivolts, at $U_4$ is 600 millivolts, at $U_5$ is 400 millivolts and at $U_6$ is 200 millivolts. When the D.C. voltage level from the buffer amplifier $U_1$ becomes greater than the reference voltage (200 millivolts) across resistor $R_9$, the output of the comparator $U_6$ will assume a high state causing transistor $Q_5$ to be forward biased into conduction. Transistor $Q_5$ forms a series path to complete the conduction path for the relay coils $K_{13}$, $K_{14}$ and $K_{15}$ to maintain the contacts in the energized state. Closing of the relay contacts $S_{13}$, $S_{14}$ and $S_{15}$ will connect the compensating capacitors across the phase conductors A, B, and C to neutral N.

As the D.C. voltage level from the buffer amplifier $U_1$ continues to be greater than the reference voltage of 400 millivolts across resistors $R_9$ and $R_8$, the output of the comparator $U_5$ will assume a high state causing transistor $Q_4$ to be forward biased into conduction. Transistor $Q_4$ will thus form a series path to complete the conduction path for the relay coils $K_{10}$, $K_{11}$ and $K_{12}$ to maintain the contact in the energized state. Closing of the relay contacts $S_{10}$, $S_{11}$ and $S_{12}$ will connect additional compensating capacitors across the phase conductors A, B, and C to neutral N.

As the D.C. voltage level from amplifier $U_1$ continues to increase with respect to the current flow through the current sensor CT, additional comparators will change state and, thus, add more compensating capacitance across the phase conductors A, B, and C to neutral N in accordance with the following table.

TABLE 1

| Nominal Current Through Current Sensor CT | Output State of Transistors Conducting | | | | |
|---|---|---|---|---|---|
| | Q5 | Q4 | Q3 | Q2 | Q1 |
| below 17.3 ampere | Not | Not | Not | Not | Not |
| 17.3 ampere | Conductiong | Not | Not | Not | Not |
| 34.6 ampere | Conducting | Conducting | Not | Not | Not |
| 51.9 ampere | Conducting | Conducting | Conducting | Not | Not |
| 69.2 ampere | Conducting | Conducting | Conducting | Conducting | Not |

TABLE 1-continued

| Nominal Current Through Current Sensor CT | Output State of Transistors Conducting | | | | |
|---|---|---|---|---|---|
| | Q5 | Q4 | Q3 | Q2 | Q1 |
| Over 86.5 ampere | Conducting | Conducting | Conducting | Conducting | Conducting |

When the capacitors are added between the phase conductors A, B, and C and neutral, the voltage at the aircraft will be increased by a proportional amount such that the conductor inductive reactance is canceled out by the capacitance.

While only five stages or levels of compensating capacitance are illustrated in FIG. 4 it is to be understood that further levels of capacitance may be added to the circuit as shown in FIG. 4. These additional levels of capacitance may be as many as five or even more.

An advantage of the present invention is that the voltages at the aircraft can be maintained with a 115±2 volts at the maximum current carrying capacity of the interconnector cables. By selectively adjusting the dynamic line drop compensator, the voltage at the aircraft can be corrected to 115±1.15 volts.

The dynamic line drop compensator is quite compact and can be readily packaged into a cast box about 24 inches wide × 10 inches deep × 3 inches high.

The component values for the embodiment as disclosed in FIG. 4 are shown in Table 2.

TABLE 2

| Capacitors | |
|---|---|
| C1 | 150 ufd. |
| C2-C16 | 25 ufd. |
| Resistors | |
| R1 | 2.7 k |
| R2 | 1.0m |
| R3 | 560 |
| R4 | 1.0m variable |
| R5-R9 | 100 |

It should also be borne in mind that the present invention can utilize an integrated circuit that includes $U_1$ through $U_6$, $R_5$ through $R_9$, $Q_1$ through $Q_5$ and $VR_1$. The relays $K_1$, $S_1$, $K_2$, $S_2$, etc. each could then be a solid state relay.

It should further be borne in mind that the present invention can be modified to incorporate a power factor transducer circuit that will sense the variation in the power factor caused by the aircraft load and adjust the voltage level at which the comparator assumes a high state.

This modification would enable the dynamic line drop compensator to adjust the voltage at the aircraft for either a change in current or a change in the loads' power factor.

The block diagram of FIG. 3 essentially comprises a sense circuit, a comparator circuit, compensator control circuit, voltage compensation and the necessary power supply circuits.

The sense circuit consist of a current sensor and the necessary amplifiers and filters to supply a voltage proportional to the current in the aircraft cable. This voltage is then fed to a comparator circuit which is an analogue level detector which consists of independent comparators, a buffer, voltage regulator, scaling resistor network and output drive resistor.

The open collector output transistors are controlled by independent comparators. These open-collector output transistors are capable of sinking up to 40 milliamperes when turned on and withstanding 18 to 34 volts in their off state. The output is switched to a low-logic level at a typical input voltage of 200 millivolts. After each 200 millivolt step, the subsequent outputs are switched to a low-logic level. This logic circuit will produce a logic change in the output transistor as the current in the aircraft cable changes. The logic switch points can be set as indicated above in Table 1.

Thus it can be seen that the dynamic line drop compensator at each service point or island corrects the voltage at individual aircraft when multiple aircraft are connected to a single power source. The dynamic line drop compensator can be utilized in other electrical distribution systems either supplying single or multi electrical equipments. While the embodiment of the invention as disclosed herein is used with a circuit of 400 Hz, it is to be borne in mind that the line drop compensator device of the present invention may be used at other electrical power line frequencies.

It will be understood that this invention is susceptible to modification in order to adapt it to different usages and conditions and, accordingly, it is desired to comprehend such modifications within this invention as may fall within the scope of the appended claims.

What is claimed is:

1. A line drop compensator device for a service point of an aircraft flight line electrical distribution system comprising a plurality of service points for aircraft connected at spaced locations to a three-phase power line including a neutral line, said power line connected to a single power source, means at each of said service points for sensing the current flow at that service point and generating a proportional signal, means at that service point for comparing said proportional signal with a reference signal and generating a control signal, and means at that service point responsive to said control signal for adding capacitance between a line and neutral to compensate for line inductance and any lagging power factor caused by the aircraft load at that service point so as to correct the voltage supplied to the aircraft proportional to the demand.

2. A line drop compensator device as claimed in claim 1 and further comprising means for connecting additional capacitance across the phase conductor and neutral in response to predetermined increases in the sensed current flow.

3. A line drop compensator device as claimed in claim 1 wherein said current flow sensing means is in one phase conductor in the power line.

4. A line drop compensator device as claimed in claim 3 wherein said capacitance adding means comprises a control circuit connected to said comparing means to receive said control signal and a compensation circuit including a capacitance.

5. A line drop compensator device as claimed in claim 4 wherein said control circuit and said compensation circuit are connected across the neutral line and the phase conductors of said power line.

6. A line drop compensator device as claimed in claim 4 and further comprising a plurality of said control circuits and said compensation circuits connectable across said neutral line and the phase conductors of said power line.

7. A line drop compensator device as claimed in claim 6 and means for connecting additional control circuits and capacitance circuits across said neutral line and phase conductors of said power line at predetermined increments of current flow sensed by said sensing means.

* * * * *